(12) United States Patent
Kwon

(10) Patent No.: US 9,768,457 B2
(45) Date of Patent: Sep. 19, 2017

(54) DRIVING CONTROL METHOD AND SYSTEM OF FUEL CELL SYSTEM

(71) Applicants: Hyundai Motor Company, Seoul (KR); Kia Motors Corporation, Seoul (KR)

(72) Inventor: Sang Uk Kwon, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 228 days.

(21) Appl. No.: 14/457,428

(22) Filed: Aug. 12, 2014

(65) Prior Publication Data

US 2015/0155574 A1   Jun. 4, 2015

(30) Foreign Application Priority Data

Nov. 29, 2013  (KR) .................. 10-2013-0147275

(51) Int. Cl.
  *H01M 8/04*    (2016.01)
  *H01M 8/04858* (2016.01)
  (Continued)

(52) U.S. Cl.
  CPC ........... *H01M 8/0488* (2013.01); *B60L 1/003* (2013.01); *B60L 7/10* (2013.01); *B60L 11/1887* (2013.01); *B60L 11/1892* (2013.01); *H01M 8/04089* (2013.01); *H01M 8/04223* (2013.01); *H01M 8/04395* (2013.01); *H01M 8/04529* (2013.01); *H01M 8/04619* (2013.01); *H01M 8/04679* (2013.01); *H01M 8/04753* (2013.01); *H01M 16/006* (2013.01); *B60L 2240/12* (2013.01); *B60L 2240/80* (2013.01); *H01M 8/04626* (2013.01); *H01M 8/04992* (2013.01); *H01M 2220/20* (2013.01); *H01M 2250/20* (2013.01); *Y02T 90/32* (2013.01); *Y02T 90/34* (2013.01)

(58) Field of Classification Search
None
See application file for complete search history.

(56) References Cited

U.S. PATENT DOCUMENTS

| 2004/0137292 A1 | 7/2004 | Takebe et al. |
| 2007/0048571 A1 | 3/2007 | Sasaki et al. |
| 2012/0141895 A1* | 6/2012 | Kwon ............... H01M 8/04037 429/429 |

FOREIGN PATENT DOCUMENTS

| JP | 2007035389 A | 2/2007 |
| JP | 2010062015 A | 3/2010 |

(Continued)

OTHER PUBLICATIONS

Taniyama JP 2011-019314 A, machine translation (Jan. 2011).*

*Primary Examiner* — Sarah A Slifka
*Assistant Examiner* — Wojciech Haske
(74) *Attorney, Agent, or Firm* — Mintz Levin Cohn Ferris Glovsky and Popeo, P.C.; Peter F. Corless

(57) ABSTRACT

A driving control method and system of a fuel cell system are provided. The method includes determining, by a controller, a dry state of a fuel cell stack and stopping an air blower, which supplies air to the fuel cell stack, using different processes based on whether the fuel cell stack is in the dry state. Accordingly, the time for which an open circuit voltage (OCV) is maintained is reduced and durability of the fuel cell is improved by preventing dry-out of the fuel cell stack.

14 Claims, 6 Drawing Sheets

(51) Int. Cl.
*H01M 16/00* (2006.01)
*H01M 8/04089* (2016.01)
*H01M 8/04223* (2016.01)
*H01M 8/0438* (2016.01)
*H01M 8/04492* (2016.01)
*H01M 8/04537* (2016.01)
*H01M 8/04664* (2016.01)
*H01M 8/04746* (2016.01)
*B60L 1/00* (2006.01)
*B60L 7/10* (2006.01)
*B60L 11/18* (2006.01)
*H01M 8/04992* (2016.01)

(56) References Cited

FOREIGN PATENT DOCUMENTS

| | | |
|---|---|---|
| JP | 2011-019314 A | 1/2011 |
| KR | 10-2010-0005768 A | 1/2010 |
| WO | 2009051033 A1 | 4/2009 |

* cited by examiner

DRIVING CONTROL METHOD AND SYSTEM OF FUEL CELL SYSTEM

CROSS-REFERENCE TO RELATED APPLICATION

The present application claims priority of Korean Patent Application Number 10-2013-0147275 filed on Nov. 29, 2013, the entire contents of which is incorporated herein for all purposes by this reference.

BACKGROUND (a) Technical Field

The present invention relates to a driving control method and system of a fuel cell system, and more particularly to a driving control method and system of a fuel cell system that improve the drivability of a vehicle and durability of a fuel cell.

(b) Background Art

Fuel cell vehicles include a fuel cell stack composed of a plurality of fuel cells stacked and used as a power source, a fuel supply system that supplies hydrogen (e.g., fuel) to the fuel cell stack, an air supply system that supplies oxygen that is an oxidizer for an electrochemical reaction, and a water/heat management system that adjusts the temperature of the fuel cell stack. The fuel supply system depressurizes compressed hydrogen in a hydrogen tank and supplies the compressed hydrogen to the anode of the stack and the air supply system supplies suctioned external air by operating an air blower to the cathode of the stack.

When hydrogen is supplied to the anode of the stack and oxygen is supplied to the anode, hydrogen ions are separated by a catalytic reaction from the anode. The separated hydrogen ions are transmitted to the oxidizing electrode, which is the cathode, through an electrolyte film and the hydrogen ions separated from the anode create an electrochemical reaction with electrons and oxygen at the oxidizing electrode to obtain electric energy. In particular, electrochemical oxidation of hydrogen occurs at the anode, electrochemical reduction of oxygen occurs at the cathode, electricity and heat are generated by movement of electrons generated in the reactions, and vapor or water is produced by a chemical reaction created by bonding of hydrogen and oxygen. In addition, a discharge unit is provided for discharging hydrogen and oxygen that do not react with the byproducts such as the vapor, water, and heat generated in the process of generating electric energy of the fuel cell stack, and the gases such as the vapor, hydrogen and oxygen are discharged to the atmosphere through a discharge channel.

In addition, fuel cell hybrid vehicles have been developed to make up for defects that may be generated when using only a fuel cell as a power source of vehicles. The fuel cell hybrid vehicles include a high-voltage battery or a super capacitor other than a fuel cell that is the main power source. The fuel cell hybrid vehicles use a fuel cell, as the main power source, which is supplied with hydrogen from a hydrogen tank and air from an air blower and generates electricity, using an electrochemical reaction of the oxygen of hydrogen and air. A driving motor and a motor controller are connected directly to the fuel cell via a main bus terminal and a super capacitor is connected via an initial charging unit for power assist and regenerative braking. Further, an LDC (Low Voltage DC/DC Converter) for converting output between a high voltage and a lower voltage and a low-voltage battery for driving parts are connected to the main bus terminal.

The components such as an air blower, a hydrogen recirculation blower, and a water pump, which activate the fuel cell, are connected to the main bus terminal and facilitate starting of the fuel cell, and various relays to facilitate connection and disconnection of power and a diode that prevents backward current to the fuel cell may also be connected to the main bus terminal.

Further, dry air supplied through the air blower is humidified through a humidifier and is then supplied to the cathode of the fuel cell stack and the gas discharged from the cathode is humidified by the water produced inside and is transmitted to the humidifier, and may be used to humidify the dry air to be supplied to the cathode by the air blower. The phenomenon that the hydrogen remaining at the anode directly passes an electrolyte film without generation of electricity and reacts with the oxygen at the cathode is called "hydrogen crossover" and is required to decrease the anode pressure at the low-output period and increase the anode pressure at the high-output period to reduce the amount of hydrogen crossover. The greater the anode pressure (e.g., hydrogen pressure), the greater the increase of the amount of hydrogen crossover and the hydrogen crossover may have a negative influence on the fuel efficiency and the durability of the fuel cell, and thus maintenance of appropriate anode pressure is required. A hydrogen purge valve is provided to ensure stack performance by discharging impurities and condensed water at the anode side and an anode exit terminal is connected with a water trap to store the condensed water and then discharge the condensed water through the valve when the amount of the condensed water reaches a predetermined level.

To improve the fuel efficiency as mentioned above, the process of stopping and restarting the fuel cell generating electricity while the vehicle travels (e.g., Fuel Cell Stop/Fuel Cell Restart), if necessary, that is, the idle stop/go control process of temporarily stopping the fuel cell generating electricity in fuel cell hybrid vehicles (e.g., On/Off of fuel cell) should be considered as being important. In particular, when stopping and restarting the fuel cell generating electricity while a vehicle travels, the control, which generally considers not only the problem of dry-out in the fuel cell stack, but also reacceleration performance and fuel efficiency of the vehicle is important.

The description provided above as a related art of the present invention is merely for helping understanding the background of the present invention and should not be construed as being included in the related art known by those skilled in the art.

SUMMARY

The present invention provides a driving control method and system of a fuel cell system that stops a fuel cell generating electricity and controls driving with the fuel cell stopping electricity generation. A driving control method of a fuel cell system according to an exemplary embodiment of the present invention may include: stopping, by a controller, operation of a fuel cell stack when the flow rate of air of the fuel cell stack is less than a predetermined reference value, after air supply to the fuel cell stack is stopped; and removing, by the controller, a voltage generated in the fuel cell stack.

The method may further include: determining, by the controller, a dry state of the fuel cell stack; and stopping, by the controller, air supply to the fuel cell stack by stopping an air blower, which supplies air to the fuel cell stack, in different ways based on the determination result. The stopping process may stop the air blower as an inertia braking type of stopping process, when a battery does not operate, the charging state of the battery is greater than a predetermined reference state, or a power converter that connects the battery and the fuel cell stack breaks down (e.g., fails). In addition, the stopping may be a process of stopping the air blower in a regenerative braking type, when the fuel cell stack is in a dry state, as the result of the determination process. The stopping may be a process of stopping the air blower in an inertia braking type, when the fuel cell stack is not in a dry state, as the result of the determination process.

The method may further include stopping the operation of the fuel cell stack and removing a voltage generated in the fuel cell stack, when the flow rate of air in the fuel cell stack is less than a predetermined reference value. The removing process may include removing a voltage generated in the fuel cell stack, using a plurality of voltage removal ways based on the result of comparing electric output generated by a regenerative braking operation of the fuel cell system with a predetermined regenerative braking limit value. In addition, the removing process may include removing a voltage generated in the fuel cell stack by supplying hydrogen to the cathode side of the fuel cell stack, when the difference between the limit value and the generated electric output is less than a predetermined reference value, as the result of the comparison.

The method may further include closing, by the controller, a valve that allows air to flow into the fuel cell stack, before the supply of hydrogen. The removing process may include removing a voltage generated in the fuel cell stack by charging a battery with the voltage generated in the fuel cell stack, when the difference between the limit value and the generated electric output is greater than a predetermined reference value, as the result of the comparison. In addition, the removing process may include removing a voltage generated in the fuel cell stack by supplying hydrogen to the cathode side of the fuel cell stack, when a battery does not operate, the charging state of the battery is greater than a predetermined reference state, or a power converter that connects the battery and the fuel cell stack breaks down. The removing process may further include removing a voltage generated in the fuel cell stack, using a plurality of voltage removal ways based on the result of comparing the speed of a fuel cell vehicle using a fuel cell as a main power source with a predetermined vehicle speed. Further, the removing process may include removing a voltage generated in the fuel cell stack by supplying hydrogen to the cathode side of the fuel cell stack, when the speed of the fuel cell vehicle is greater than the predetermined reference vehicle speed, as the result of the comparison.

The method may further include closing, by the controller, a valve that allows air to flow into the fuel cell stack, before the supply of hydrogen. The removing process may include removing a voltage generated in the fuel cell stack by charging a battery with the voltage generated in the fuel cell stack, when the speed of the fuel cell vehicle is less than the predetermined reference vehicle speed, as the result of the comparison. In addition, the removing of a voltage may be performed, when the voltage generated in the fuel cell stack is maintained over a predetermined time, after the operation of the fuel cell stack is stopped.

According to the driving control method of a fuel cell system according to an exemplary embodiment of the present invention, the time for which an open circuit voltage (OCV) is maintained may be reduced and durability of the fuel cell may be improved by preventing dry-out of the fuel cell stack. Further, reacceleration performance of a fuel cell vehicle may be improved in reacceleration after stopping electricity generation of a fuel cell and a loss of fuel efficiency of a fuel cell vehicle may be reduced.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
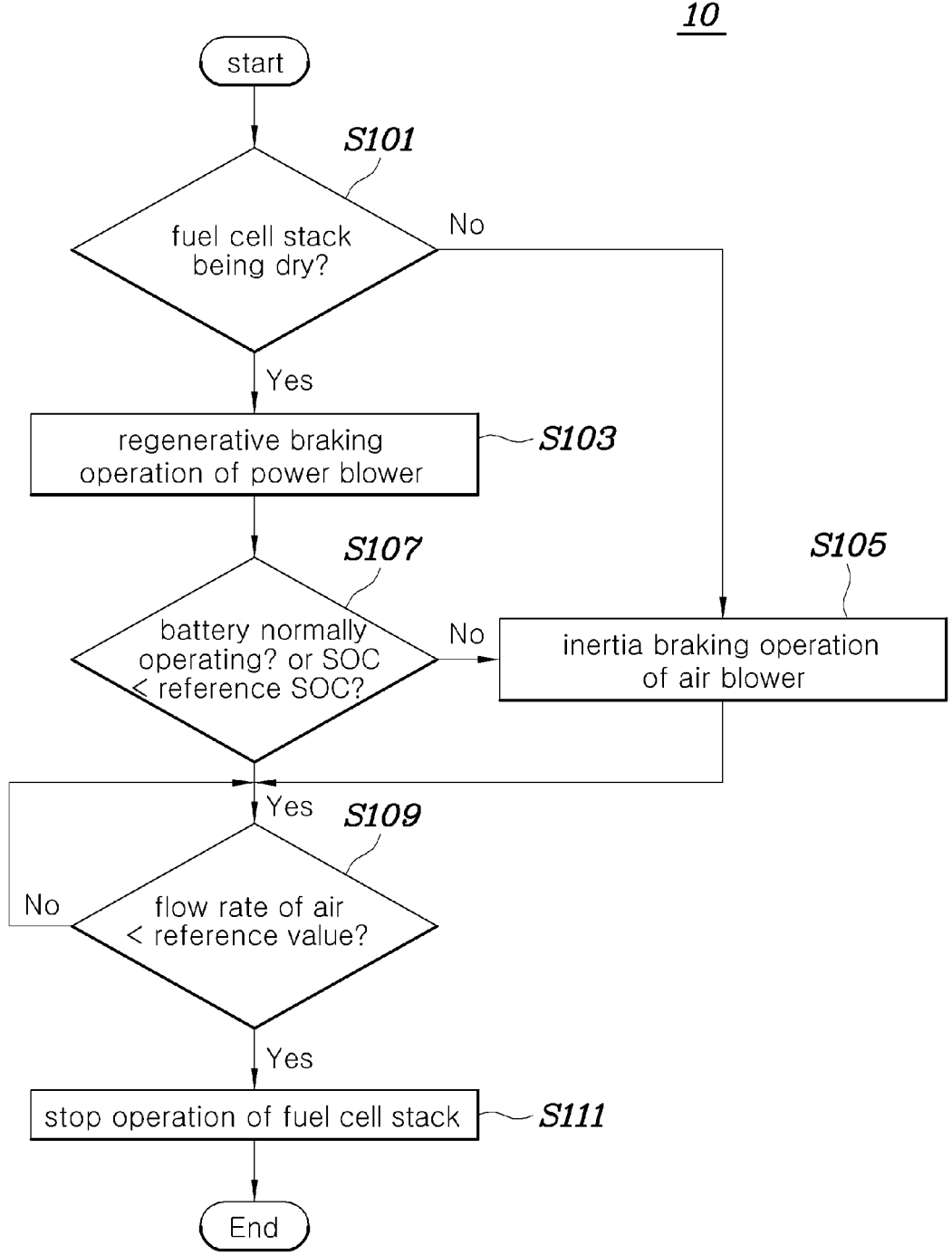
FIG. 1 is an exemplary flowchart briefly illustrating a driving control method of a fuel cell system according to an exemplary embodiment of the present invention.

It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Specific structural and functional descriptions of exemplary embodiments of the present invention provided this specification or application are exemplified for the purpose of explaining exemplary embodiments according to the present invention and the exemplary embodiments of the present invention may be implemented in various ways and should not be construed as being limited to the exemplary embodiments provided in this specification or application. Embodiments of the present invention may be variously changed and modified in various ways, so specific exemplary embodiments are shows in the drawings as examples and will be described in detail in this specification or application. However, it is to be understood that exemplary embodiments according to spirit of the present invention are not limited to the specific exemplary embodiments, but include all modifications, equivalents, and substitutions included in the spirit and the scope of the present invention.

Terms including "first" and/or "second" may be used to describe various components, but the components are not limited to the terms. The terms are used to distinguish one component from another component, and for instance, a first component may be referred to as a second component, and similarly, a second component may be referred to as a first component without departing from the scope according to the spirit of the present invention.

It is to be understood that when one element is referred to as being "connected to" or "coupled to" another element, it may be connected directly to or coupled directly to another element or be connected to or coupled to another element by other element intervening therebetween. On the other hand, it is to be understood that when one element is referred to as being "connected directly to" or "coupled directly to" another element, it may be connected to or coupled to another element without the other element intervening therebetween. Other expressions describing the relationships of components, that is, "between" and "directly between", or "close to" and "directly close to" should be understood in the same way.

Unless indicated otherwise, it is to be understood that all the terms used in the specification including technical and scientific terms has the same meaning as those that are understood by those who skilled in the art. It must be interpreted that the terms defined by the dictionary are identical with the meanings within the context of the related art, and they are not interpreted as ideal or excessively formal meanings unless the context clearly dictates otherwise in this specification.

The present invention is described hereafter in detail by describing exemplary embodiments of the present invention with reference to the accompanying drawings. Like reference numerals given in the drawings indicate like components.

FIG. 1 is an exemplary flowchart illustrating a driving control method of a fuel cell system according to an exemplary embodiment of the present invention. Referring to FIG. 1, a driving control method 10 according to an exemplary embodiment of the present invention may be configured to determine whether a fuel cell stack is in a dry state (S101). The method of determining whether a fuel cell stack is in a dry state may be achieved by a relative humidity estimator for the air at the exit of the fuel cell stack, as known in the art. Alternatively, the dry state may be determined from the inclination of an IV (current-voltage) curve by monitoring the IV curve.

An air blower motor controller (not shown) may be configured to operate the rotation of an air blower that supplies air to the fuel cell stack and stop air supply to the fuel cell stack by stopping the rotation of the air blower in different ways, depending on whether the fuel cell stack is in a dry state. When the fuel cell stack is in a dry state, the air blower motor controller may be configured to stop the air blower using regenerative braking by operating the air blower in regenerative braking operation (S103). The regenerative braking operation may relatively rapidly stop air flow into the fuel cell stack. Accordingly, the process may prevent the fuel cell stack from becoming drier due to external dry air. When the fuel cell stack is not in a dry state, the air blower motor controller may be configured to stop the air blower using inertia braking by an inertia braking operation (S105), that is, may be configured to operate the air blower to stop, using only inertia without regenerative braking operation. In the inertia braking operation, an acceleration performance may be ensured using the number of inertia revolutions in reacceleration of the fuel cell. In other words, since the air blower may be configured to gradually stop during the inertia braking operation, the number of revolutions may be rapidly increased from the number of revolutions of the air blower when restart of the fuel cell is required.

On the other hand, although the fuel cell stack is in a dry state and the air blower is operated in the regenerative braking type, when a battery or a power converter for restoring regenerative braking output does not operate normally (e.g., failure occurs) or a limit is applied to the regenerative braking due to the SOC (State Of Charge) of the battery being greater than a reference SOC, the air blower motor controller may be configured to operate the air blower using the inertia braking. As the air blower is stopped, that is, after the air supply to the fuel cell stack is stopped, when the flow rate of air in the fuel cell stack is less than a reference value, the fuel cell controller may be configured to stop the operation of the fuel cell stack. The operation mode when the fuel cell stops may be called a fuel cell stop mode.

Figure 2:
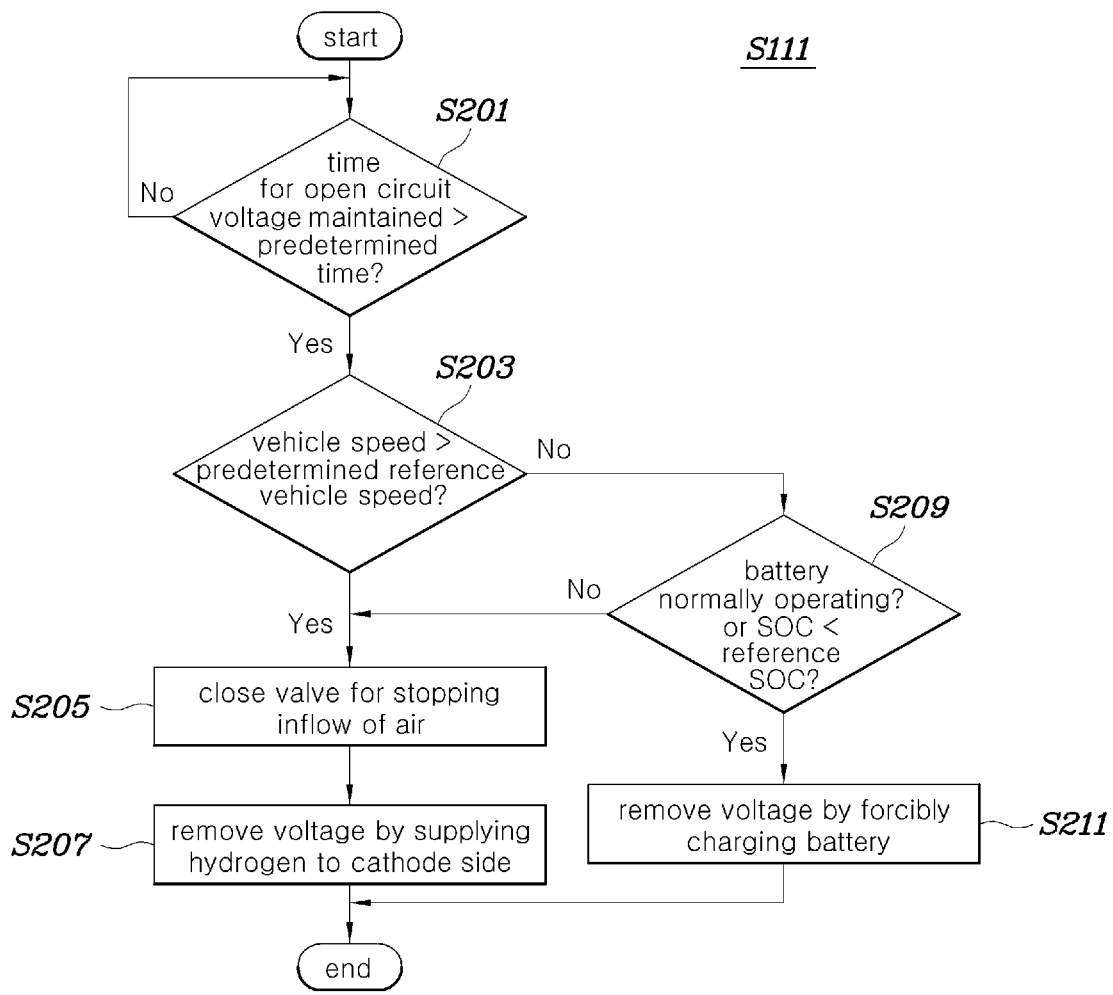
FIG. 2 is an exemplary flowchart illustrating a method of stopping operation of a fuel cell system according to an exemplary embodiment of the present invention.
Figure 3:
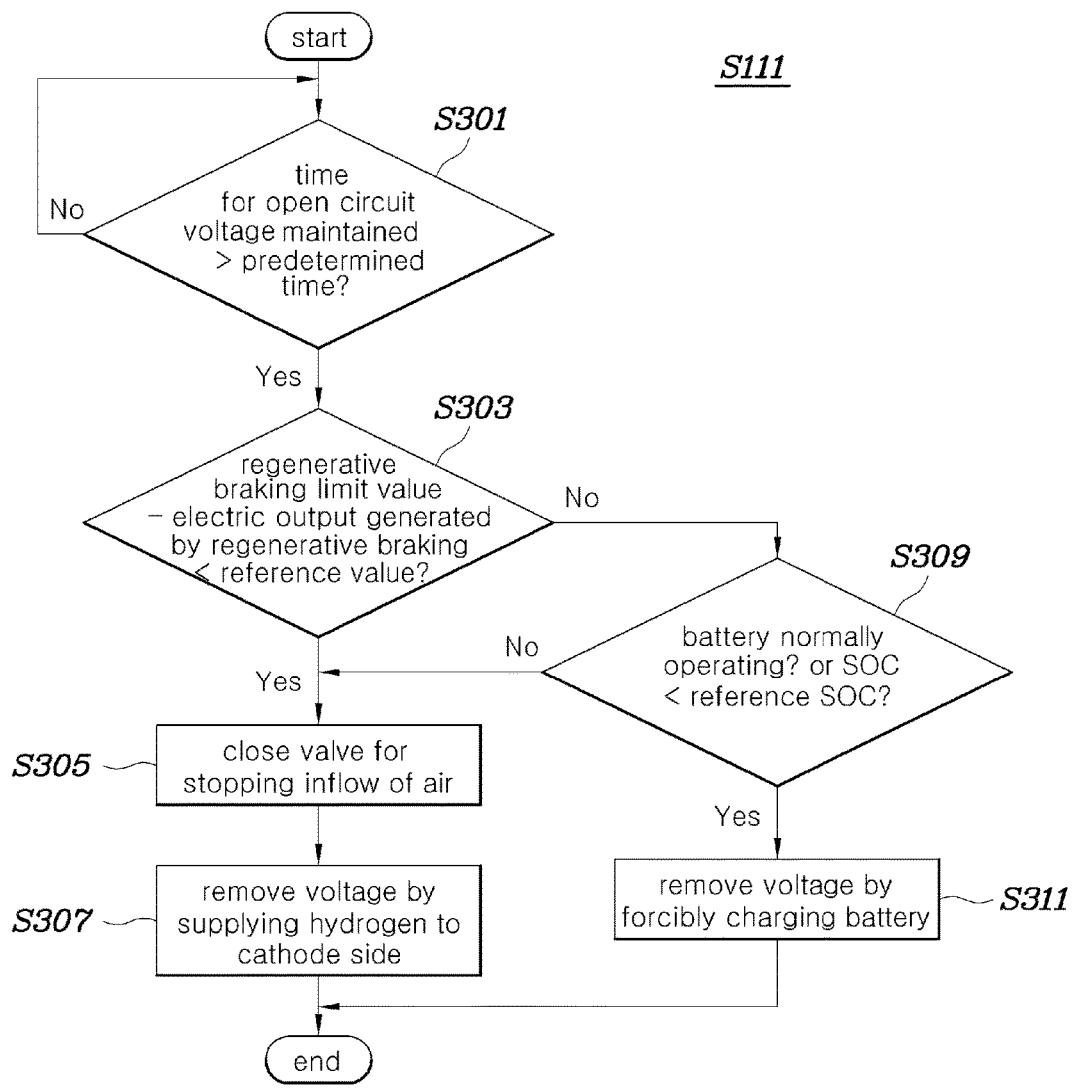
FIG. 3 is an exemplary flowchart illustrating a method of stopping operation of a fuel cell system according to another exemplary embodiment of the present invention.

FIG. 2 is an exemplary flowchart illustrating a method of stopping operation of a fuel cell system according to an exemplary embodiment of the present invention. FIG. 3 is an exemplary flowchart illustrating a method of stopping operation of a fuel cell system according to another exemplary embodiment of the present invention. In particular, FIGS. 2 and 3 illustrate a driving control method of a fuel cell in a fuel cell stop mode. Even though the operation of the fuel cell stack may be stopped, the voltage generated in the fuel cell stack may not be immediately decreased. When ram air, which is applied in the opposite direction to the movement direction of a fuel cell vehicle in motion, flows inside or there is no hydrogen crossover by a hydrogen gas passing through a membrane, the voltage generated in the fuel cell stack may be maintained at a substantially high voltage (e.g., a predetermined voltage) of an open circuit voltage (OCV). Maintaining a substantially high voltage may separate platinum of the catalytic layer and cause deterioration and thus is disadvantageous in terms of durability of the stack.

First, the fuel cell controller may be configured to compare the lengths of the time (e.g., the amount of time) for which the open circuit voltage generated in the fuel cell stack is maintained with a predetermined time (S201, S301). In other words, the fuel cell controller may be configured to determine whether to remove the voltage generated in the fuel cell stack. When the time for which the open circuit voltage generated in the fuel cell stack is maintained is greater than a predetermined time, the predetermined time may be set in advance to the time with a need of removal of voltage in the fuel cell stack. When the time for which the open circuit voltage generated in the fuel cell stack is maintained is greater than a predetermined time, the voltage generated in the fuel cell stack may be removed. Accordingly, the voltage reduction of the fuel cell stack should be controlled; however, when the voltage of the fuel cell stack is maintained below a predetermined level, the time to increase the voltage in restarting of the fuel cells increases and a reacceleration performance may deteriorate. Thus, the stack voltage may be reduced lower than the open circuit voltage in consideration of the reacceleration performance of the fuel cell vehicle.

Moreover, the fuel cell controller may be configured to remove the voltage generated in the fuel cell stack by comparing the speed of a fuel cell vehicle using a fuel cell as a main power source with a predetermined reference vehicle speed (S203) and by using a plurality of voltage removal methods in response to the comparison result. When the speed of a fuel cell vehicle is greater than a predetermined reference vehicle speed, the voltage generated in the fuel cell stack may be removed by closing the valve that allows fuel to flow into the fuel stack and purging the hydrogen at the cathode. The predetermined vehicle speed may be a cathode hydrogen purge voltage removal reference vehicle speed and may be set not to limit regenerative braking output of the air blower. In addition, when the vehicle speed is greater than the reference vehicle speed, a regenerative braking energy may be generated. Accordingly, when a regenerative braking energy is generated, the method of removing the voltage of the fuel cell stack by removing a cathode oxygen through a reaction of hydrogen and oxygen at the cathode side by purging hydrogen at the cathode exit without removing the voltage of the fuel cell stack in a way of charging a battery to use the regenerative braking energy may be used (S207).

Further, the fuel cell controller may be configured to remove the voltage generated in the fuel cell stack by comparing the electric output generated by a generative braking operation with a predetermined regenerative braking limit value (S303) and by using a plurality of voltage removal methods in response to the comparing result. When the electric energy generated by regenerative braking is greater than the regenerative braking limit value, the generated electric energy in terms of fuel efficiency may be used to remove the voltage by closing the valve that stops air inflow (S305) and supplying hydrogen to the cathode side (S307). The regenerative braking limit value may be the charging capacity of the battery. The air stop valve may be closed, before the voltage is removed (S205, S305) to improve the efficiency of the hydrogen-oxygen reaction at the cathode side, since when the air stop valve is open, the hydrogen to be supplied to the cathode side may leak out to the atmosphere through the air stop valve.

When the speed of a fuel cell vehicle is less than a predetermined reference vehicle speed, or when the electric energy generated by regenerative braking is less than the regenerative braking limit value, energy may be stored by forcibly charging the battery and simultaneously the voltage of the fuel cell stack may be removed (S211, S311) by determining whether the battery operates normally (e.g., whether a failure has occurred) or the current charging state of the battery is less than a reference charging state (S209, S309). When the voltage generated in the fuel cell stack is not sufficiently removed even by supplying hydrogen to the cathode side or by forcibly charging the battery, the voltage generated in the fuel cell stack may be removed by additionally connecting a load to the fuel cell stack.

Figure 4A:
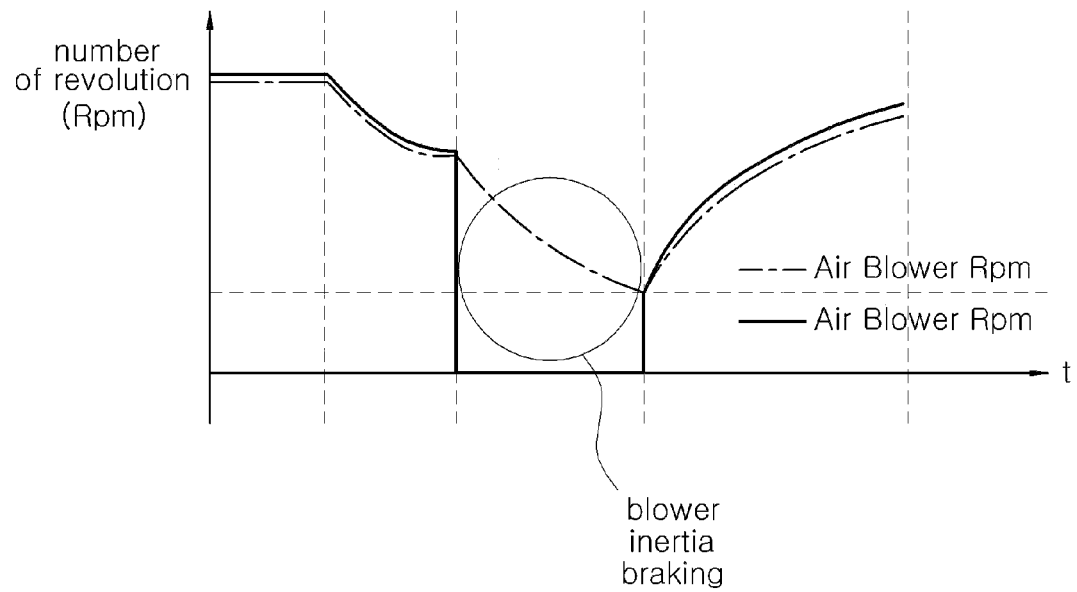
FIGS. 4A to 4B are exemplary graphs showing changes in number of revolutions of an air flower to time in regenerative braking operation and inertia braking operation according to an exemplary embodiment of the present invention.
Figure 4B:
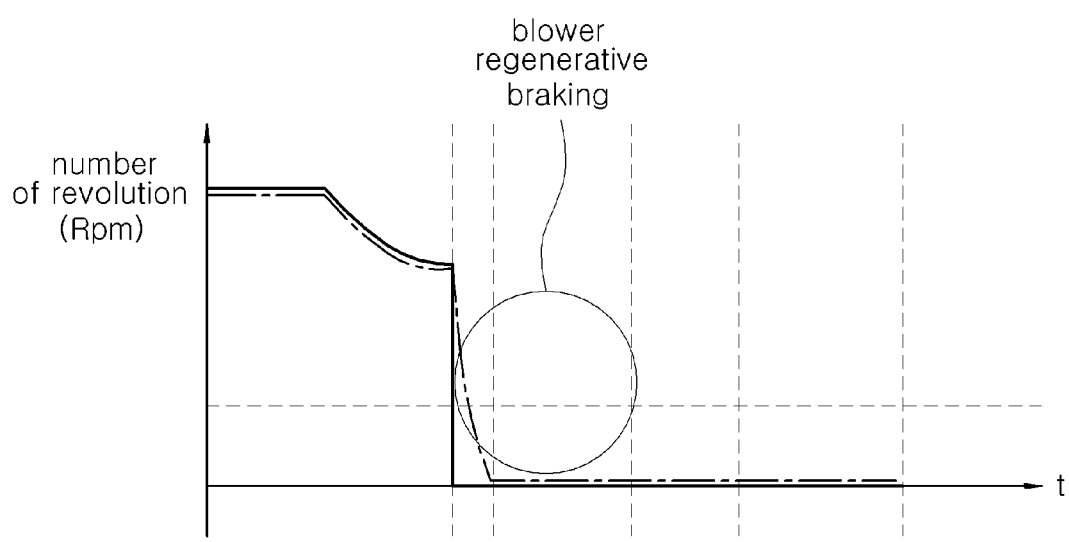

FIGS. 4A to 4B are exemplary graphs showing changes in number of revolutions of an air flower depending on the time in regenerative braking operation and inertia braking operation according to an exemplary embodiment of the present invention. In particular FIGS. 4A and 4B show that the number of revolutions (Rpm) of the air blower operated by an instruction of rotating the air blower from the air blower motor controller is slowly decreased even though a stop control signal is sent to the air blower in the blower inertial braking operation (FIG. 4B), and is rapidly decreased to almost match with the instruction of stopping rotation of the air blower in blower regenerative braking operation (FIG. 4B).

In other words, the number of revolutions of the air blower slowly or rapidly decreases, depending on whether the air blower is operated in the inertia braking type or the regenerative braking type. As seen from FIG. 4A, dry air may flow into the fuel cell stack and deteriorate the humidified state of the stack in the inertia braking operation. In contrast, since the number of revolutions of the air blower is slowly decreased, an acceleration performance may be ensured by using the number of revolutions of the air blower at that time in reacceleration. Further, when the fuel cell stack is in a dry state, the deterioration of humidifying of the fuel cell stack due to air inflow may be prevented by operating the air blower in the regenerative braking type.

Figure 5A:
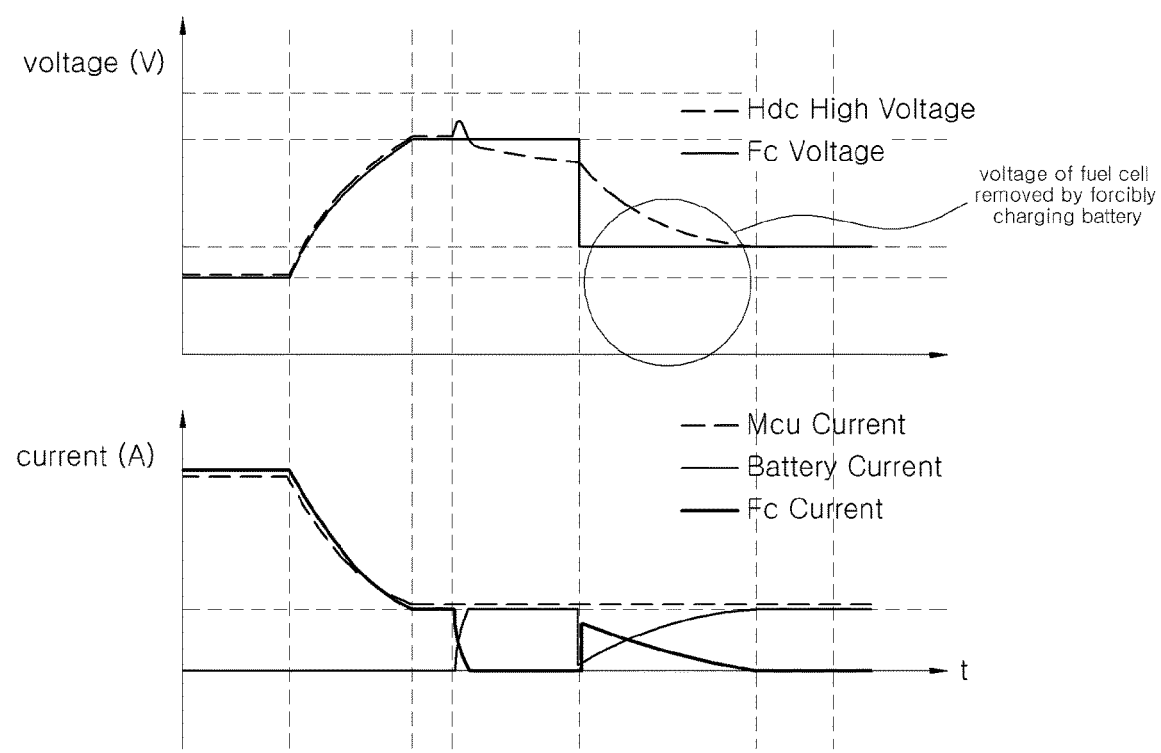
FIGS. 5A and 5B are exemplary graphs showing changes in voltage and current in different methods of removing a voltage generated in a fuel cell stack.
Figure 5B:
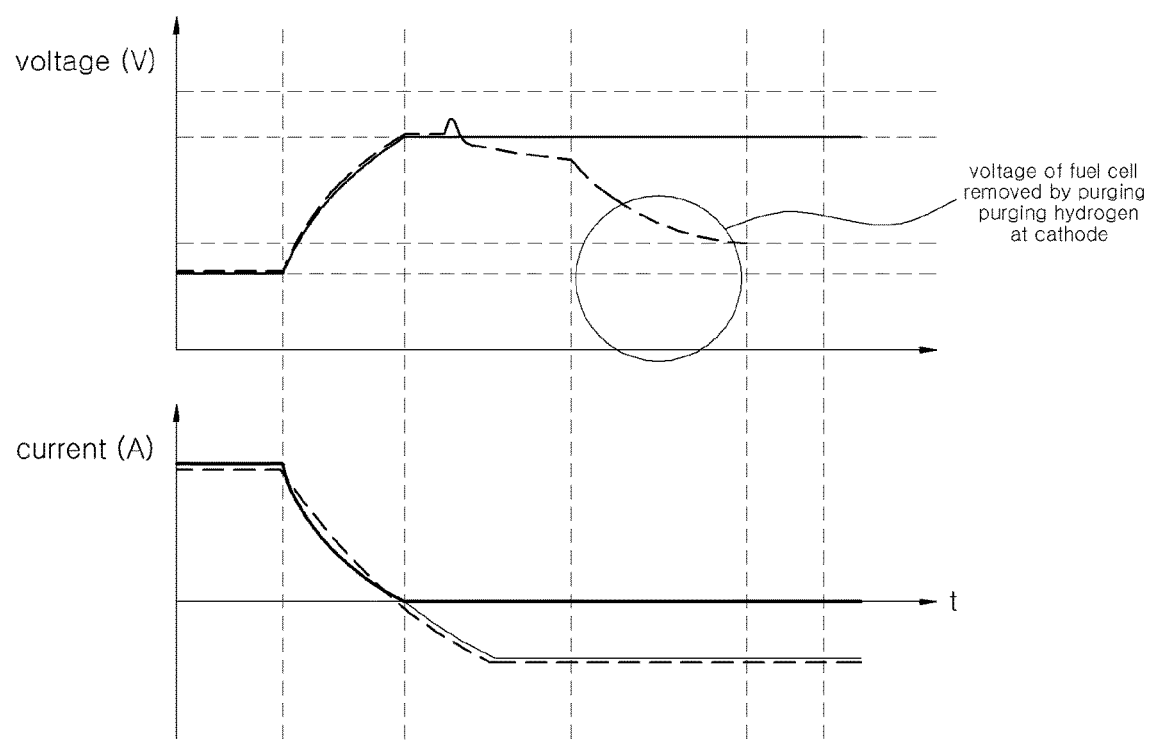

FIGS. 5A and 5B are exemplary graphs showing changes in voltage and current in different methods of removing a voltage generated in a fuel cell stack. In particular, FIG. 5A shows that as the battery is forcibly charged after the voltage of a power converter (HDC) is lowered to less than the voltage generated in the fuel cell, the current changes. In addition, FIG. 5B shows that the voltage applied to the fuel cell stack is decreased without changing the voltage of the power converter. In other words, the graphs show that the voltage generated in the fuel cell stack may be removed (e.g., cathode hydrogen purge fuel cell voltage may be removed) by supplying hydrogen to the cathode side of the fuel cell stack without a change in current. The voltage of the fuel cell stack may be removed by forcibly charging the battery with the voltage of the fuel cell stack by adjusting the voltage of the power converter when regenerative braking is not used after the fuel cell stop mode is started. In contrast, when the regenerative braking is used after the fuel cell stop mode is started the voltage of the fuel cell stack may be removed by purging hydrogen to the cathode to prevent reduction of the electric energy generated by regenerative braking due to forcible charging of the battery.

Although the present invention has been described with reference to the exemplary embodiments illustrated in the drawings, those are merely examples and may be changed and modified into other equivalent exemplary embodiments from the present invention by those skilled in the art. Therefore, the technical protective region of the present invention should be determined by the scope described in the accompanying claims.

What is claimed is:

1. A driving control method of a fuel cell system, comprising:
    stopping, by a controller, operation of a fuel cell stack when a flow rate of air of the fuel cell stack is less than a predetermined reference value, after air supply to the fuel cell stack is stopped; and
    removing, by the controller, a voltage generated in the fuel cell stack,
    wherein the removing process includes removing, by the controller, a voltage generated in the fuel cell stack, using a plurality of voltage removal processes based on the result of comparing electric output generated by a regenerative braking operation of the fuel cell system with a predetermined regenerative braking limit value,
    wherein the removing process includes removing, by the controller, a voltage generated in the fuel cell stack by supplying hydrogen to the cathode side of the fuel cell stack, when the difference between the limit value and the generated electric output is less than a predetermined reference value, as the result of the comparison, and
    wherein the removing process includes removing, by the controller, a voltage generated in the fuel cell stack by charging a battery with the voltage generate in the fuel cell stack, when the difference between the limit value and the generated electric output is greater than a predetermined reference value, as the result of the comparison.

2. The method of claim 1, further comprising:
    determining, by the controller, a dry state of the fuel cell stack; and
    stopping, by the controller, air supply to the fuel cell stack by stopping an air blower that is configured to supply air to the fuel cell stack, in different ways based on whether the fuel cell stack is in a dry state or not.

3. The method of claim 2, wherein the stopping process includes stopping, by the controller, the air blower using an inertia braking, when a battery does not operate, the charging state of the battery is greater than a predetermined reference state, or a power converter that connects the battery and the fuel cell stack fails.

4. The method of claim 2, wherein the stopping process includes stopping, by the controller, the air blower using a regenerative braking, when the fuel cell stack is in a dry state.

5. The method of claim 2, wherein the stopping process includes stopping, by the controller, the air blower using an inertia braking, when the fuel cell stack is not in a dry state.

6. The method of claim 1, further comprising:
    closing, by the controller, a valve that allows air to flow into the fuel cell stack, before the supply of hydrogen.

7. The method of claim 1, wherein the removing process includes removing, by the controller, a voltage generated in the fuel cell stack by supplying hydrogen to the cathode side of the fuel cell stack, when a battery does not operate, the charging state of the battery is greater than a predetermined reference state, or a power converter that connects the battery and the fuel cell stack fails.

8. The method of claim 1, wherein the removing process includes removing, by the controller, a voltage generated in the fuel cell stack, using a plurality of voltage removal processes based on the result of comparing the speed of a fuel cell vehicle using a fuel cell as a main power source with a predetermined reference vehicle speed.

9. The method of claim 8, wherein the removing process includes removing, by the controller, a voltage generated in the fuel cell stack by supplying hydrogen to the cathode side of the fuel cell stack, when the speed of the fuel cell vehicle is greater than a predetermined reference vehicle speed, as the result of the comparison.

10. The method of claim 9, further comprising:
    closing, by the controller, a valve that allows air to flow into the fuel cell stack, before the supply of hydrogen.

11. The method of claim 8, wherein the removing process includes removing, by the controller, a voltage generated in the fuel cell stack by charging a battery with the voltage generated in the fuel cell stack, when the speed of the fuel cell vehicle is less than a predetermined reference vehicle speed, as the result of the comparison.

12. The method of claim 1, wherein the removing of a voltage is performed by the controller, when the voltage generated in the fuel cell stack is maintained over a predetermined time, after the operation of the fuel cell stack is stopped.

13. A fuel cell system having a driving control system, comprising:
    a memory configured to store program instructions; and
    a processor configured to execute the program instructions, the program instructions when executed configured to:
        stop operation of a fuel cell stack when a flow rate of air of the fuel cell stack is less than a predetermined reference value, after air supply to the fuel cell stack is stopped; and
        remove a voltage generated in the fuel cell stack,
        wherein the program instructions for the removing of the voltage when executed are further configured to remove a voltage generated in the fuel cell stack, using a plurality of voltage removal processes based on the result of comparing electric output generated by a regenerative braking operation of the fuel cell system with a predetermined regenerative braking limit value,
        wherein the program instructions for the removing of the voltage when executed are further configured to remove a voltage generated in the fuel cell stack by supplying hydrogen to the cathode side of the fuel cell stack, when the difference between the limit value and the generated electric output is less than a predetermined reference value, as the result of the comparison, and
        wherein the program instructions for the removing of the voltage when executed are further configured to remove a voltage generated in the fuel cell stack by charging a battery with the voltage generated in the fuel cell stack, when the difference between the limit value and the generated electric output is less than a predetermined reference value, as the result of the comparison.

14. The system of claim 13, wherein the program instructions when executed are further configured to:

determine a dry state of the fuel cell stack; and
stop air supply to the fuel cell stack by stopping an air blower that is configured to supply air to the fuel cell stack, in different ways based on whether the fuel cell stack is in a dry state or not.

* * * * *